W. W. LYMAN.
Stopper for Fruit Jars.
No. 51,844. Patented Jan'y 2, 1866.
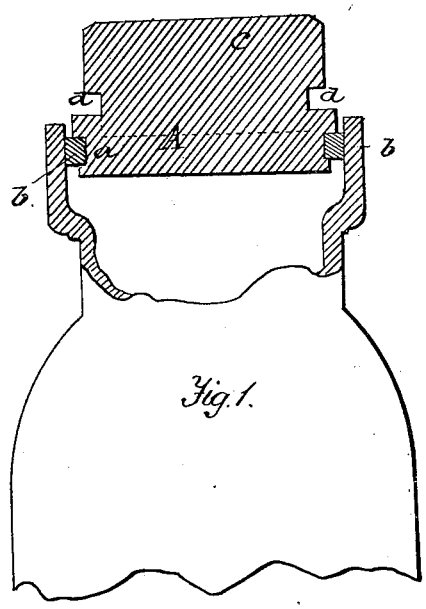
Fig. 1.
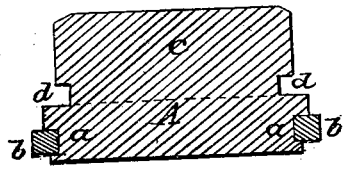
Witnesses.
Levi E. Coe
George A. Fay
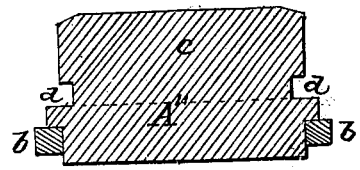
Inventor.
W. W. Lyman

UNITED STATES PATENT OFFICE.

WILLIAM W. LYMAN, OF WEST MERIDEN, CONNECTICUT.

IMPROVED STOPPER FOR FRUIT-JARS.

Specification forming part of Letters Patent No. 51,844, dated January 2, 1866.

*To all whom it may concern:*

Be it known that I, WILLIAM W. LYMAN, of West Meriden, county of New Haven and State of Connecticut, have invented certain new and useful Improvements in Stoppers for Fruit-Jars; and I do hereby declare that the same is described and represented in the following specification and drawings; and to enable others skilled in the art to make and use the same I will proceed to describe it sconstruction, referring to said drawing, in which the same letters indicate like parts in each of the figures.

The nature of this improved stopper will be understood from the specification and drawing.

The object desired to be attained by this improvement is to provide a suitable means whereby the stopper may be more easily removed when it is desired to open the jar.

In the accompanying drawing, Figure 1 represents the upper portion and neck of the jar as in common use.

A is a glass stopper having a depression formed in the upper side, and having nearly a flat surface on the under side, the diameter of which is made less than that of the inner diameter of the neck of the jar, and is provided with a rabbet or groove, $a$, to receive an elastic packing-ring, $b$. This packing-ring is made of india-rubber or other suitable elastic material, and of such size as to fill the space between the bottom of the rabbet or groove $a$ and the neck of the jar, when it (the stopper) is firmly pressed down therein. $c$ is a thumb-piece or lifter for the purpose of turning it (the stopper) while pressing it down into the neck of the jar and to aid in removing it therefrom, and for that purpose it is provided with notches $d$ on each end, by means of which, and by the aid of a cord placed into one or both of said notches and inserting a pin downward between the packing-ring and stopper, said stopper may be easily and quickly removed.

A' represents a stopper without a depression on the upper side.

A" represents a stopper made with a rabbet instead of a groove to receive the packing-ring and without a depression in the upper side.

It is believed that this improvement will be found of great advantage in jars, where it is desirable to use stoppers instead of caps, because of the ease and facility with which they may be inserted and removed.

I believe I have thus shown the nature, construction, and advantage of this improvement so as to enable others skilled to make and use the same.

What I claim, therefore, and desire to secure by Letters Patent, is—

A glass stopper, A, for fruit-jars, constructed with a thumb-piece, $c$, notches $d$, recess $a$, ring $b$, depressed top, and flat bottom, as described.

W. W. LYMAN. [L. S.]

Witnesses:
LEVI E. COE,
GEORGE A. FAY.